United States Patent [19]

Hsin-Chu

[11] 4,239,540
[45] Dec. 16, 1980

[54] MILKY CURING AGENT FOR CONCRETE AND PREPARATION METHOD THEREOF

[76] Inventor: Chen Hsin-Chu, No. 34-7, Hsin-Tang-Pu, Pa-Li Hsiang Taipei Hsien, Taiwan

[21] Appl. No.: 96,611

[22] Filed: Nov. 21, 1979

[51] Int. Cl.³ .............................................. C08L 91/00
[52] U.S. Cl. ...................................... 106/12; 106/250; 106/252; 106/268; 106/271; 252/311; 252/312
[58] Field of Search ................. 106/12, 250, 252, 268, 106/271; 252/311, 312

[56] References Cited

U.S. PATENT DOCUMENTS

| 3,228,777 | 1/1966 | Kubie | 106/12 |
|---|---|---|---|
| 3,354,180 | 11/1967 | Ekiss et al. | 106/12 |

*Primary Examiner*—Lorenzo B. Hayes
*Attorney, Agent, or Firm*—Thompson, Birch, Ganthier & Samuels

[57] ABSTRACT

A milky curing agent for concrete is made by thoroughly mixing paraffin wax, cocoanut oil, soybean oil, linseed oil, stearic acid, hexacosanic acid, water and ethyl cyanuric ester to produce emulsion of curing agent.

2 Claims, 1 Drawing Figure

MILKY CURING AGENT FOR CONCRETE AND PREPARATION METHOD THEREOF

BACKGROUND OF THE INVENTION

Conventional methods for curing concrete may be roughly classified as follows:
(a) Moist curing,
(b) Steam curing, and
(c) Membrane curing.

For moist curing, the concrete should be always supplied with water. If the water is not supplied continuously, the intermittent moistening and drying effect may crack the concrete surface. If water floods on the concrete surface in a long period, it may corrode or erode the concrete because of the impurities or corrosives contained therein.

The steam curing method is generally applied to make precasting concrete as in mass production. It is not suitably applied for curing concrete for buildings, roads, airport runways and other concrete construction in large areas.

Regarding membrane curing method, a sealing compound is always used to form a membrane on the concrete surface to prevent moisture loss. Conventional sealing compounds such as white paint comprising oil, wax, resin and fine paint powder may be used. However, it will be deteriorated by exposure to the weather to form spots on the concrete surface so that the concrete appearance will be contaminated. If water-soluble asphalt or oil-soluble asphalt is used as the sealing compound, it may absorb solar heat to increase expansion and shrinkage effects which will cause cracks on the concrete surface.

Another recently developed curing agent has included a drying agent which will increase the total production cost and may affect the product quality as residue is released from said drying agent.

SUMMARY OF THE INVENTION

The object of the present invention is to provide a milky curing agent for concrete and its preparation method which is carried out by mixing paraffin wax, cocoanut oil, soybean oil, linseed oil, stearic acid, hexacosanic acid, water and ethyl cyanuric ester to form an emulsion-type curing agent having the following advantages:
(1) It is neutral and not corrosive to concrete.
(2) Its moisture loss rate is small so that enough water is provided for the hydration and setting of cement for better concrete strength, earlier setting time and sound appearance.
(3) There is no need to spray water on the cured concrete within one month after being treated with the present curing agent so that labor cost may be saved in the construction project.
(4) The setting time of concrete is shortened by using the present curing agent to prevent hydrolysis of concrete when impregnated in the water.

DESCRIPTION OF THE PREFERRED EMBODIMENT

Figure 1:
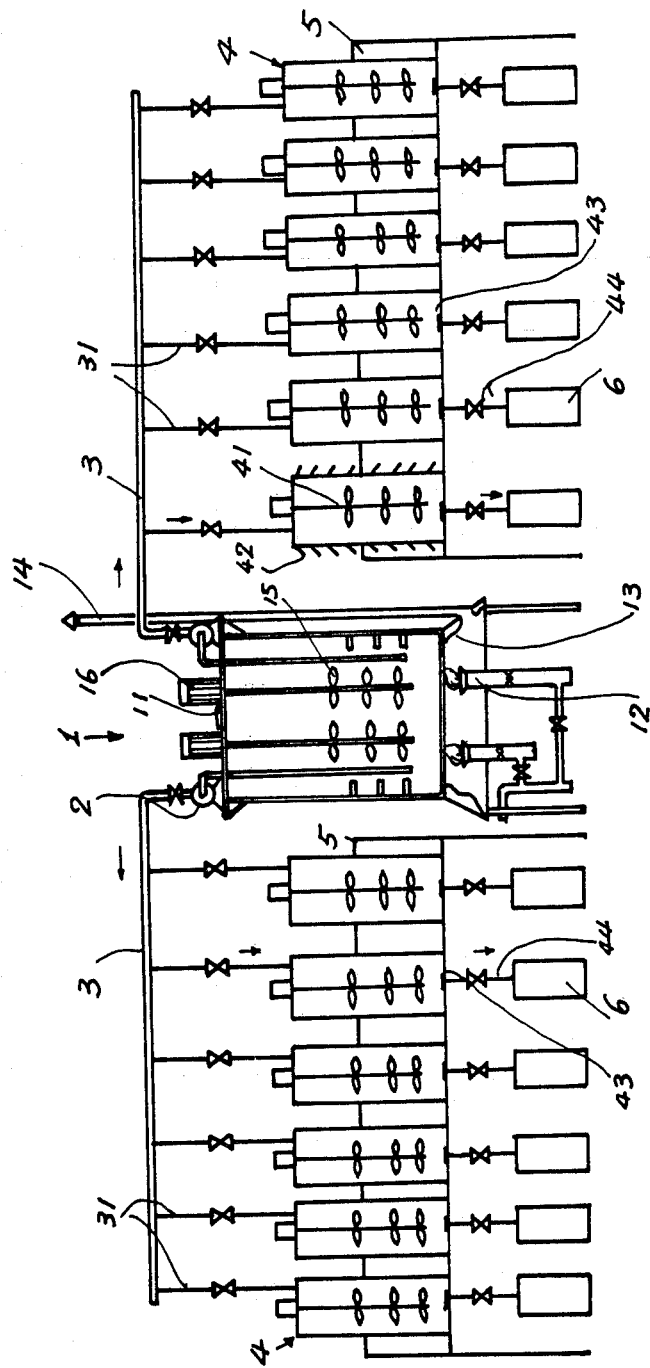
FIG. 1 is the schematic diagram of equipments used for preparation of the present invention.

As shown in FIG. 1, the emulsion reactor 1 is fed with a mixture of soybean oil, linseed oil (refined at high temperature), paraffin wax, cocoanut oil, steric acid, hexacosanic acid and water through port 11. Burner 12, hood 13 and stack 14 are provided with said reactor 1. A propeller agitator 15 driven by motor 16 is also provided on said reactor 1. The reaction mixture is agitated thoroughly and heated slowly until the wax is completely dissolved The reaction mixture is then heated to 83° through 88° C. The emulsifying agent, ethyl cyanuric ester, is then added and the reaction mixture is further agitated for 2.5 hours at that temperature to complete the emulsifying reaction.

The produced emulsifying liquid is then delivered by pump 2 through pipe 3 and branch pipe 31 to cooling tank 4. All tanks 4 are installed on frame 5. Said tank 4 is provided with agitator 41 for further mixing the reaction product. Fins 42 are provided on tank wall to enhance the air cooling for the product. Filter 43 and drain 44 are provided under each tank 4 to fill the oil product into collecting can or drum 6.

EXAMPLE 1

By using the preparation method as above-mentioned, the following raw materials are charged into reactor 1 for emulsion reaction:

|  | Weight, Kg | Weight, % |
|---|---|---|
| Soybean oil | 51 | 3.3 |
| Linseed oil | 64 | 4.2 |
| Paraffin wax | 280 | 18.2 |
| Cocoanut oil | 64 | 4.2 |
| Water | 960 | 62.5 |
| Stearic acid | 52 | 3.4 |
| Hexacosanic acid | 24 | 1.6 |
| Ethyl Cyanuric ester | 40 | 2.6 |
| Total | 1535 Kg | 100 % |

After the reaction is completed, 1500 kg curing agent is obtained in milky color. Pipette of sample is taken into centrifuge for five-minutes running. No precipitation is formed to demonstrate good emulsion property without settlement and demulsibility. Other properties are tested with the following results:

Specific gravity: 0.94
Water retention: 0.027–0.038 g/cm$^2$
Drying time: 3 hours
Reflection: 28% (tested by coating the agent on cement floor)
Covering rate: 1 gal/200 ft$^2$
(*Note: Tested according to ASTM C309, C156)

EXAMPLE 2

Three concrete specimens are made by mixing cement, sand and gravel (1:3:6). Each specimen has a dimension of 15 1 cm diameter×30 cm height. Each specimen is added with two liters of the present curing agent. For control test, other three specimens are also made the same size. All specimens are tested to obtain the data as shown in Table 1.

TABLE 1

| | Test of Concrete Specimens | | |
|---|---|---|---|
| Identification No. | Maximum Load, kg | Compressive kg/cm$^2$ | Strength Psi |
| Specimen excluding | | | |
| curing agent, No.1 | 8,250 | 47 | 663 |
| No.2 | 10,550 | 59 | 848 |
| No.3 | 9,600 | 54 | 770 |
| Specimen including | | | |

TABLE 1-continued

| Identification No. | Test of Concrete Specimens | | |
|---|---|---|---|
| | Maximum Load, kg | Compressive kg/cm² | Strength Psi |
| curing agent, No.1 | 13,800 | 78 | 1100 |
| No.2 | 14,150 | 80 | 1130 |
| No.3 | 15,500 | 88 | 1240 |

2. Testing method: ASTM C39

From the above analysis, it is understood that the strength of the concrete specimen having the present curing agent has strength much stronger than those without the present curing agent.

EXAMPLE 3

The well blended concrete is paved on an airport runway. After surface moisture is vaporized and released, the curing agent of the present invention is sprayed on the runway. The sprayed area is 20 m² per gallon of curing agent. After 5.5 hours curing, the agent is dried to form a protective membrane suitable for a man's walk. After 24 hours, a car may be driven over the runway. Contrarily, concrete without spraying the present curing agent will not be dried for at least 72 hours. The concrete using the present curing agent will thus be dried faster.

The present curing agent may be applied onto concrete surfaces either by brush or by sprayer. Once applying the present curing agent on the concrete, it is not necessary to spray the surface with water. The concrete surface will be lustrous and the solar heat will be reflected to prevent water vaporization from under the membrane so that enough water will facilitate the cement hydration and setting so as to develop compression strength faster and to prevent cracks from occurring on the concrete surface.

I claim:

1. A milky concrete curing agent produced by mixing paraffin wax, cocoanut oil, soybean oil, linseed oil, stearic acid, Hexacosanic acid and water which are slowly heated and thoroughly agitated until the wax is completely dissolved, raising the reaction temperature to 83° to 88° C. and adding ethyl cyanuric ester as the emulsifying agent, and reacting the mixture with agitation for 2.5 hours within said temperature range to complete the emulsification.

2. A milky concrete curing agent according to claim 1, comprising:
Paraffin wax: 18.2%
Cocoanut oil: 4.2%
Soybean oil: 3.3%
Linseed oil: 4.2%
Stearic acid: 3.4%
Hexacosanic acid: 1.6%
Water: 62.5%
Ethyl Cyanuric ester: 2.6%
based upon 100% by weight of total reactants.

* * * * *